US006827385B2

(12) United States Patent
Mobley

(10) Patent No.: US 6,827,385 B2
(45) Date of Patent: Dec. 7, 2004

(54) CARGO ORGANIZER SYSTEM

(76) Inventor: Gary Mobley, 1629 Ridge Rd., Highland, MI (US) 48356

(*) Notice: Subject to any disclaimer, the term of this patent is extended or adjusted under 35 U.S.C. 154(b) by 0 days.

(21) Appl. No.: 10/699,961

(22) Filed: Nov. 3, 2003

(65) Prior Publication Data
US 2004/0094985 A1 May 20, 2004

Related U.S. Application Data
(60) Provisional application No. 60/422,997, filed on Nov. 1, 2002.

(51) Int. Cl.[7] .............................................. B62D 33/00
(52) U.S. Cl. ...................... 296/39.2; 296/37.6; 410/129
(58) Field of Search .............................. 296/39.2, 37.6; 410/129, 139

(56) References Cited

U.S. PATENT DOCUMENTS

| 4,200,046 A | * | 4/1980 | Koliba et al. ................. 410/94 |
| 4,717,298 A | * | 1/1988 | Bott ............................ 410/129 |
| 4,733,898 A | * | 3/1988 | Williams ................... 296/24.32 |
| 5,044,682 A | | 9/1991 | Wayne ........................ 296/39.2 |
| 5,090,763 A | | 2/1992 | Kremer et al. .............. 296/39.1 |
| 5,154,478 A | * | 10/1992 | Erickson et al. ............ 296/39.2 |
| 5,240,301 A | | 8/1993 | Arnold ........................ 296/39.2 |
| 5,265,993 A | | 11/1993 | Wayne ........................ 410/129 |
| 5,597,193 A | * | 1/1997 | Conner ....................... 296/37.6 |
| 6,017,075 A | * | 1/2000 | Emery et al. ............... 296/39.1 |
| 6,170,897 B1 | * | 1/2001 | Karrer ........................ 296/39.2 |
| 6,478,356 B1 | * | 11/2002 | Wayne ........................ 296/39.2 |

* cited by examiner

Primary Examiner—Joseph D. Pape
(74) Attorney, Agent, or Firm—Gifford, Krass, Groh, Sprinkle, Anderson & Citkowski, P.C.

(57) ABSTRACT

The present invention provides a cargo organizer system and liner for use with a truck bed. The liner system is formed of molded plastic and includes sidewalls disposed with cargo bins for the storage of tools, containers and various other objects or materials. Each sidewall includes a flat support surface for supporting objects thereon above the liner floor. The system includes means for partitioning the cargo area such that multiple types of cargo may be separated as desired.

8 Claims, 2 Drawing Sheets

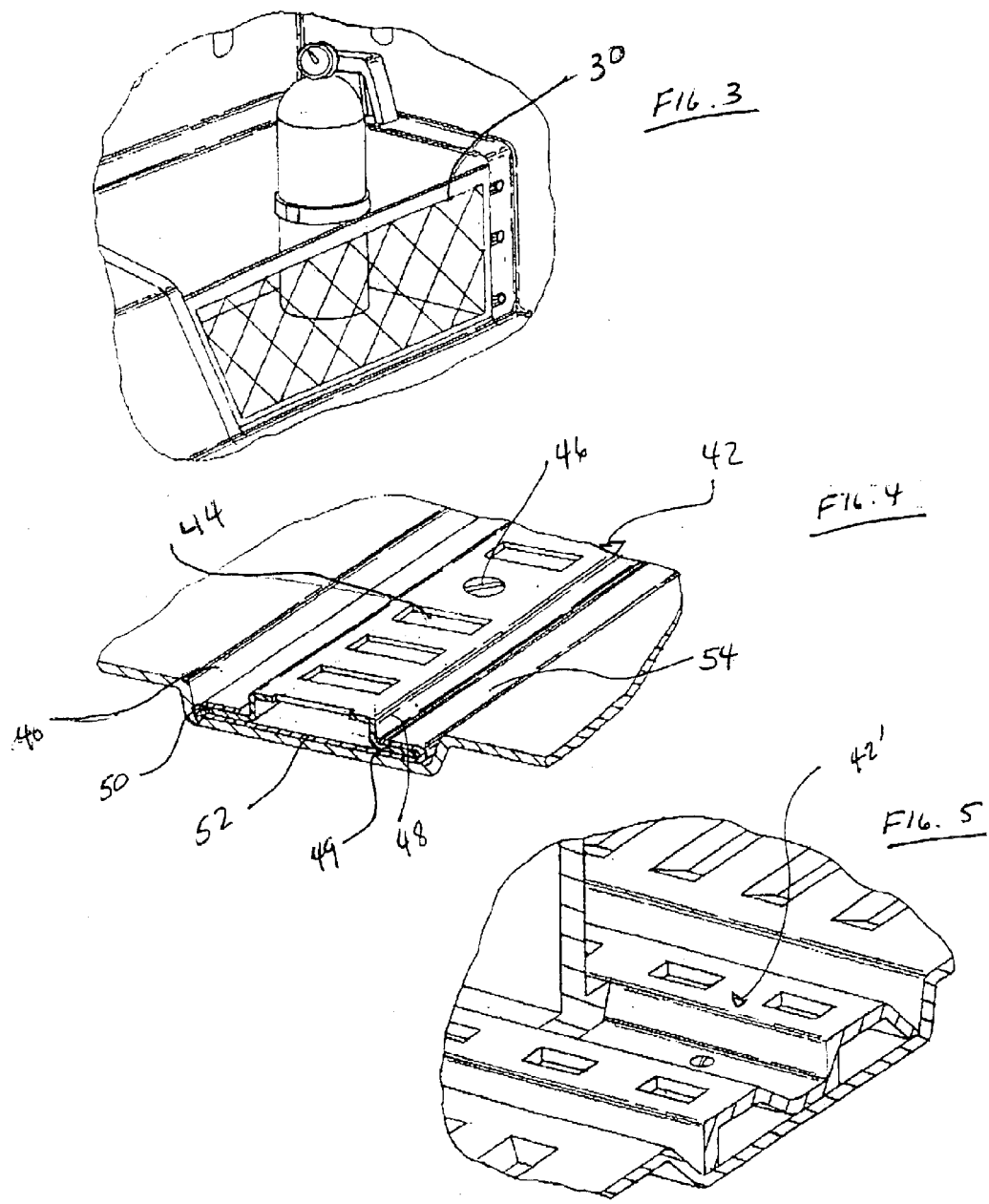

US 6,827,385 B2

CARGO ORGANIZER SYSTEM

RELATED APPLICATION

This application claims the benefit of U.S. Provisional Application Ser. No. 60/422,997 filed Nov. 1, 2002.

FIELD OF THE INVENTION

The present invention relates to truck bed liners and more particularly to a molded truck bed liner having a plurality of cargo storage areas for transporting and stabilizing a wide variety of materials and equipment.

BACKGROUND OF THE INVENTION

Removable truck bed liners for pickup trucks are traditionally used to protect the surfaces of the truck bed from scratches, dents, soiling and the like for enabling a truck to be used to haul cargo without causing damage to the truck bed surface.

Typically, these liners are molded of a plastic material which can be made to be aesthetically appealing as well as durable. In some cases, partitions are arranged within the truck bed liner to define separate cargo carrying areas whereby a user may carry more than one type of cargo at the same time without concern of the cargo's becoming mixed or shifted around during transport.

However, these liners are typically specialized for a particular purpose and are not satisfactory for use in a variety of different applications. Accordingly, a universal cargo organizer system has been developed which facilitates loading and unloading of materials without causing damage to the truck bed surface as well as the organizing of tools, work boxes and the like.

SUMMARY OF THE INVENTION

The present invention provides a universal cargo organizer system for a truck having a truck bed such as a pickup truck.

The cargo organizer system includes a molded plastic liner portion dimensioned to be received into, and operative to cover, a portion of the bed of the pickup truck such that the surface of the truck bed is substantially protected against scratches and/or other damage during cargo transport.

The liner portion includes a floor and two elongated sidewalls extending upwardly from the floor to a top end that is substantially equivalent to the height of the walls of the truck bed. Each sidewall extends upwardly from the floor that includes a longitudinal centerline. The liner also a pair of spaced apart end panel portions wherein one of the end panel portions extends along the wheel well. The pair of end panel portions extend upwardly from the floor and inwardly from each of the pair of side walls to define a cargo bin. The cargo bin includes an open side toward the centerline of the floor such that cargo can be easily fitted into the cargo bin area by pushing or sliding the object across the floor through the open side.

A portion of the top end of each sidewall includes a flat support surface being above and parallel to the floor. This flat surface can be used to facilitate the stacking of sheet materials at the top end of the sidewalls on a flat surface or used to support tool boxes or other equipment at an elevated position above the floor.

At least one containment member is selectably attachable to the open side of the cargo bin such that objects contained within each bin are restrained from movement toward the centerline of the floor during transport.

BRIEF DESCRIPTION OF THE DRAWINGS

A better understanding of the present invention will be had upon reference to the following detailed description when read in conjunction with the accompanying drawings in which like parts are given like reference numerals and wherein:

FIG. 3 illustrates the cargo organizer system as according to the invention and an enlarged view of a cargo bin disposed with an object;

FIG. 4 illustrates a partition mounting member disposed in a recess formed in the floor of the cargo liner system; and FIG. 5 illustrates an alternative embodiment of a partition mounting member.

DETAILED DESCRIPTION OF THE INVENTION

The present invention provides a truck bed liner that has utility as a protective covering for the truck bed as well as a bed liner that includes at least one compartmentalized storage bin formed therein for disposing tools, lunch boxes or other equipment and materials as desired.

Figure 1:
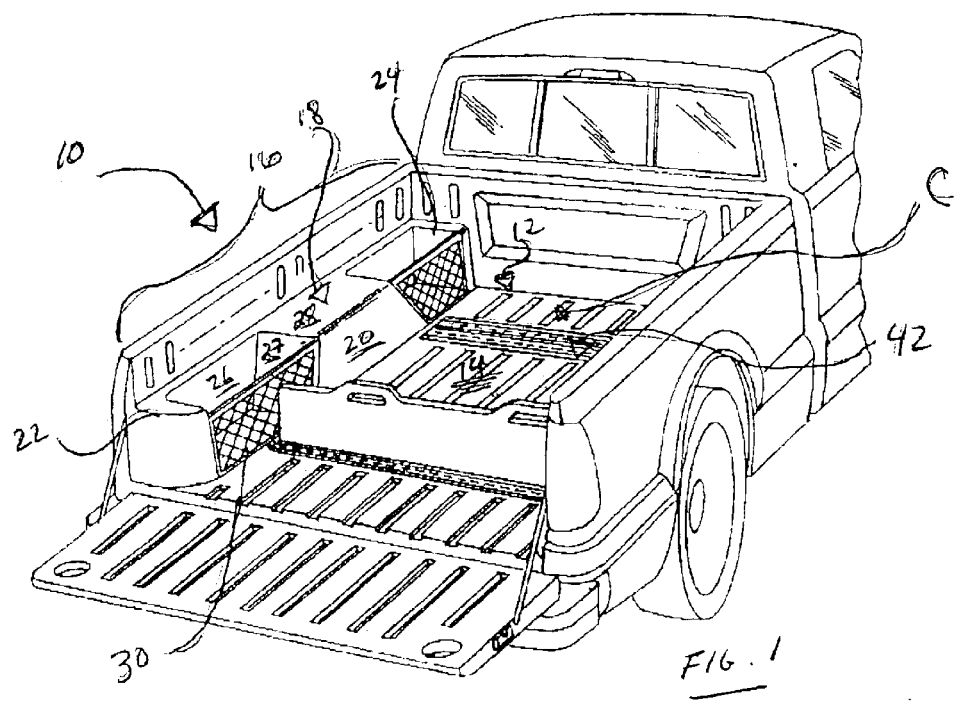
FIG. 1 is a perspective view of the inventive truck bed liner disposed in a pickup truck as according to the invention.

With reference to FIG. 1, the bed liner and cargo organizer system 10 includes a molded plastic liner portion 12 dimensioned to be received into and operative to cover a portion of the truck bed. The liner portion 12 protects the truck bed from damage or defacing when loading, unloading or transporting cargo. Additionally, the liner portion 12 is also operative to preserve the truck bed against corrosion due to exposure.

The liner portion 12 includes a floor 14 and two elongated sidewalls 16. Each sidewall 16 is preferably formed integral to and extends upwardly from the floor 14 to a flat, shelf-like top end which provides a flat surface for supporting items in a plane above and parallel to the floor 14.

Each sidewall portion 16 includes a wheel well cover 18 having a width that extends perpendicularly toward a centerline C of the floor 14 and terminates at a wheel well sidewall 20 which is parallel to a sidewall of the truck bed.

The sidewalls 16 also include proximal 22 and distal 24 ends that extend perpendicularly toward the centerline C of the floor 14. The proximal 22 and distal 24 ends cooperate with the wheel well cover 18 to form cargo bins 26.

The liner portion 12 also includes a pair of spaced apart end panel portions 27 wherein one of the end panel portions extends along the wheel well. The pair of end panel portions 27 extend upwardly from the floor 14 and inwardly from each of the pair of side walls to define a cargo bin 26. The cargo bin 26 includes an open side toward the centerline of the floor 14 such that cargo can be easily fitted into the cargo bin 26 area by pushing or sliding the object across the floor through the open side.

As briefly described above, each sidewall includes a top end 28 that provides a substantially flat support surface positioned above and parallel to the floor 14. It is appreciated that the top end 28 of each sidewall 16 may be used to support items at a raised position above the floor 14 of the liner 12. In this manner, a user may position tools, sheet materials or other items at a readily accessible position above the floor 14 such that reaching over the sidewall and down into the truck bed to obtain possession of an item may be avoided.

Figure 2:
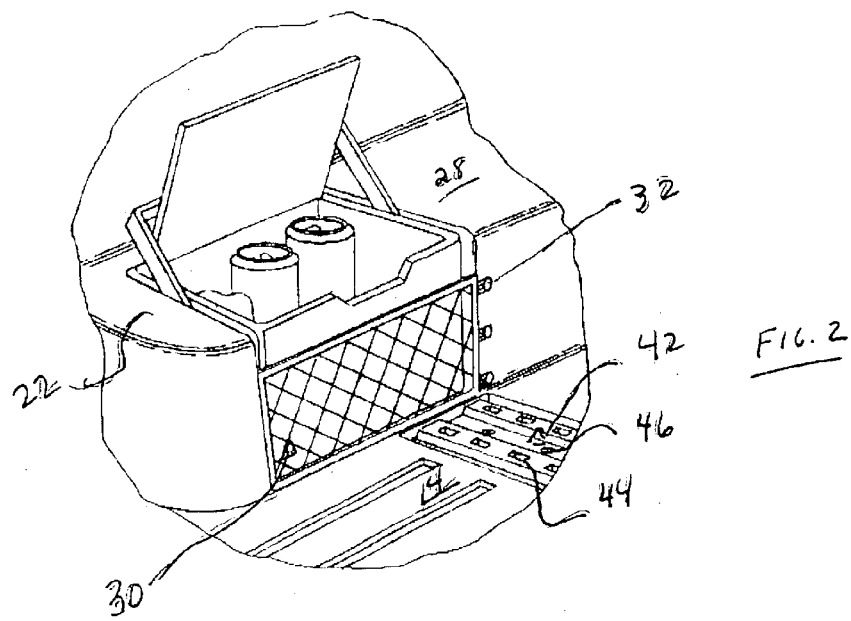
FIG. 2 is a perspective view of an object being disposed in a cargo bin of the cargo organizer system as according to the invention.

With reference to FIG. 2, at least one containment member 30 is selectably attachable to the open side of each cargo bin 26 for retaining items therein against movement toward the centerline C of the floor 14. The containment member 30 may be formed of a molded plastic panel that is disposable at the open side of each cargo bin 26 via a conventional fastening means which illustratively include hinge and latch assemblies or complementary tongue and groove engagement means. The containment member 30 may also be formed of mesh netting and/or natural or synthetic fabric materials. In such case, each containment member 30 will include a fastening means along a portion of its peripheral edge for engaging a complementary fastening means disposed at the open side of each cargo bin 26.

The fastening means 32 may be any conventional fastening means that allows the user to selectably engage and disengage the containment member as desired but otherwise remains fastened at the open side of the cargo bin 26.

As best illustrated in FIGS. 3 and 4, the floor 14 of the liner portion 12 includes at least one recessed portion 40 adapted to receive a partition mounting member 42. The partition mounting member 42 includes a plurality of apertures 44 for receiving complementary mounting fasteners disposed on a partition to be attached thereto. The fasteners disposed on the partition may be provided in the form of spring-loaded clips which compress and expand upon insertion into the apertures for ease of assembly. Suitable clips are manufactured by Teledyne Technologies Inc. The clips are fixedly mounted to the bottoms of the partitions which are thereafter engaged with the apertures 44 to section off portions of the truck bed.

With reference to FIG. 4, the partition mounting member 42 preferably includes through holes 46 to permit a user to fixedly attach the partition mounting member 42 within the recessed portion 40 with a conventional fastening means such as a bolt. The recessed portions 40 are dimensioned to receive the partition mounting members 42 in a manner such that the top surface of the mounting members 42 are substantially even with the plane of the floor 14.

Preferably, each partition mounting member 42 includes a metal strip 48 having a flat outer surface with a pair of flanges 49 extending from the bottom of two sidewalls thereof. The metal strip 48 is received in a backing plate 50 having a flat bottom surface 52 and U-shaped arms 54 to receive the flanges 49 of the metal strip 48 therein. The backing plate 50 is used to distribute the forces generated from the loading of cargo against the partitions mounted in the partition mounting members 42. FIG. 5 illustrates an alternative embodiment of a partition mounting member 42' for receiving a partition such that the cargo area of the liner portion may be sectioned off.

From the foregoing, a liner system for truck beds is provided that can be utilized with pickup trucks, SUVs, vans and the like. The partition mounting members provided permit a user to install partitions for dividing portions of the cargo space. Preferably, the sidewalls of the liner system include recesses similar to those disposed in the floor 14 whereby partition mounting members 42 can be disposed therein for partitioning portions of the sidewall for cargo bins in a fashion similar to that described above for partitioning off sections of the floor 14.

Having described the inventive cargo organizer and liner system for a truck bed, it is appreciated that many modifications thereto may become apparent to one of skill in the art without deviation from the spirit of the invention as defined by the scope of the appended claims.

I claim:

1. A liner system for a truck having a truck bed and a pair of wheel wells, said system comprising:

a molded plastic liner portion dimensioned to be received into and operative to cover a portion of the truck bed, said liner having:
a floor and a pair of side walls, said side walls extending upwardly from said floor, said floor having a longitudinal centerline, said liner further having a pair of spaced apart end panel portions, one of said panel portions extending along said wheel well, said pair of panel portions extending upwardly from said floor and inwardly from each of said pair of side walls to define a cargo bin having an open side; and
at least one containment member selectably attachable to said cargo bin extending across said open side, said containment member operative to restrain objects contained within said cargo bin from movement toward the centerline of the floor.

2. The system of claim 1 wherein the floor further comprises at least one recessed portion adapted to receive a partition mounting member.

3. The system of claim 2 wherein said partition mounting member includes a plurality of apertures for receiving complementary mounting fasteners disposed on a partition.

4. The system of claim 1 wherein another of said pair of panel portions at distal ends of said two sidewalls forms a front wall adjacent a passenger compartment of the truck.

5. The system of claim 1 wherein said at least one containment member is formed of a mesh netting material.

6. The system of claim 1 wherein at least one of said cargo bins is adapted to receive a cooler.

7. The system of claim 2 wherein said partition mounting member has a top surface extending at or below the floor.

8. A liner system for a truck having a truck bed and a pair of wheel wells, said system comprising:

a molded plastic liner portion dimensioned to be received into and operative to cover a portion of the truck bed, said liner having:
a floor and a pair of side walls, said side walls extending upwardly from said floor, said floor having a longitudinal centerline, said liner further having a pair of spaced apart end panel portions, one of said end panel portions extending along said wheel well, said pair of panel portions extending upwardly from said floor and inwardly from each of said pair of side walls to define a cargo bin having an open side;
at least one containment member selectably attachable to said cargo bin extending across said open side, said containment member operative to restrain objects contained within said cargo bin from movement toward the centerline of the floor; and
at least one recessed portion adapted to receive a partition mounting member having a plurality of apertures for receiving complementary mounting fasteners disposed on a partition.

* * * * *